United States Patent [19]
Pijlman

[11] Patent Number: 5,250,973
[45] Date of Patent: Oct. 5, 1993

[54] CAMERA COMBINATION

[75] Inventor: Ron Pijlman, Bothell, Netherlands

[73] Assignee: ID Traders Limited, Kowloon, Hong Kong

[21] Appl. No.: 884,013

[22] Filed: May 18, 1992

[51] Int. Cl.$^5$ .................. G03B 17/02; G03B 29/00
[52] U.S. Cl. ............................. 354/288; 354/76; 354/293
[58] Field of Search ............. 354/288, 65, 293, 295, 354/81, 75, 76

[56] References Cited

U.S. PATENT DOCUMENTS

| | | | |
|---|---|---|---|
| D. 41,900 | 11/1911 | Ford | D16/2 |
| D. 115,727 | 7/1939 | Anderson | D16/2 |
| D. 270,839 | 10/1983 | Greif | D16/1 |
| D. 289,409 | 4/1987 | Colani | D16/2 |
| 4,081,806 | 3/1978 | Seckendorf | 354/288 X |
| 4,232,958 | 11/1980 | Fukahori et al. | 354/288 X |
| 4,803,504 | 2/1989 | Maeno et al. | 354/64 |
| 4,907,022 | 3/1990 | Myers | 354/76 |
| 4,989,024 | 1/1991 | Myers | 354/76 |
| 5,115,264 | 5/1992 | Schappler | 354/288 X |

Primary Examiner—Michael L. Gellner
Assistant Examiner—Jae N. Noh
Attorney, Agent, or Firm—Dowrey & Associates

[57] ABSTRACT

A handheld snapshot camera is combined with a casing therefor which forms a portion of an aircraft fuselage with a foreshortened wingspan. The casing functions as a carrying case and a novelty amusement device or a toy airplane. The snapshot camera fits snugly within the casing and cooperates with the casing structure and contour such that the film spool-winding operator is exposed in an unobtrusive manner adjacent one of the motor mount positions on one side of the simulated cockpit area. The camera shutter trip button forms a portion of the top surface of the foreshortened wing on the opposite side of the cockpit convenient for use in the picture taking mode. A flash attachment or hot shoe is mounted to the underside of one of the foreshortened wings to receive a standard flash unit. A pivotally mounted nose cone section of the aircraft functions as a lens cap. The camera is accurately positioned within the aircraft fuselage so as to cooperate with a view finder frame which also constitutes a portion of the aircraft cockpit formation.

12 Claims, 4 Drawing Sheets

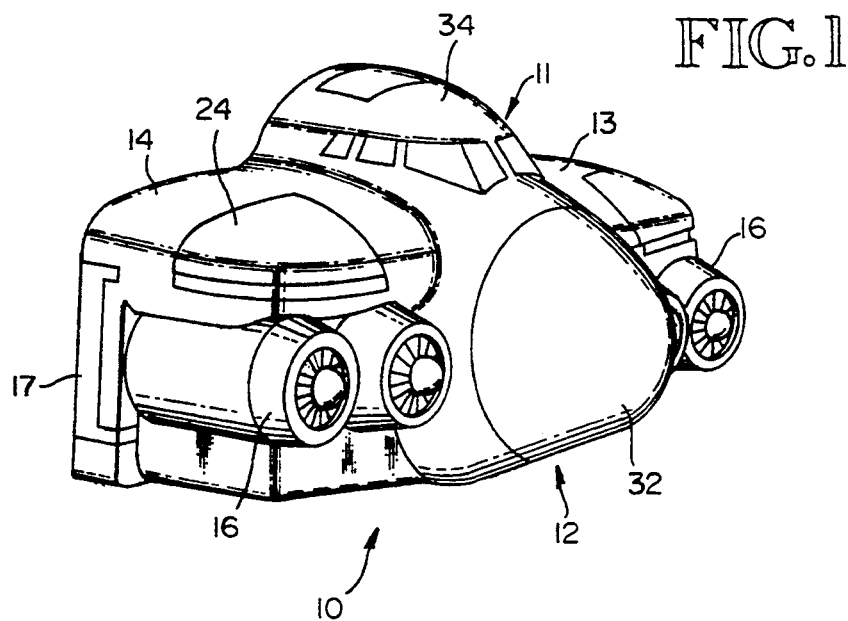
FIG. 1
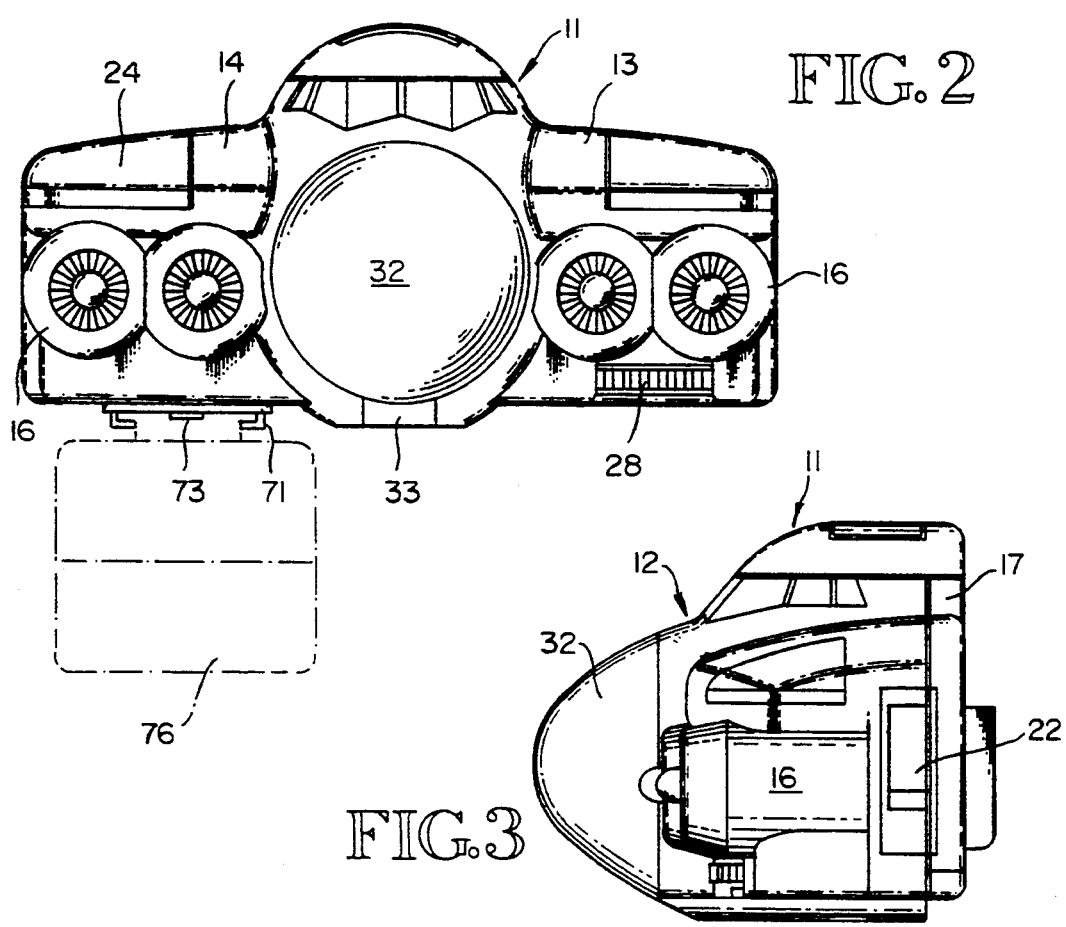
FIG. 2
FIG. 3

CAMERA COMBINATION

BACKGROUND OF THE INVENTION

1. Field of the Invention

The present invention relates generally to a hand held snapshot camera and novelty casing combination. More particularly the invention relates to such combination wherein the casing functions as a novelty, amusement or toy airplane device and carrying case while combining structurally and functionally with the camera structure. Although not so limited, the camera combination has particular utility in the air travel industry as a promotional amusement or novelty item or as a toy device for small children who tend to become bored and need diversion during long flights. Inexpensive small snapshot cameras are now available at a cost suitable for concession stand and in-flight marketing. These items are appealing to adults as well as small children and provide suitable travel gifts. Historically the snapshot camera has become a standard item with tourists and travelers and the present invention combines the snapshot camera with an amusement device particularly suitable for the air travel industry.

2. Description of the Prior Art

The prior art contains examples of specialized camera housings for specialized uses or specialized environments such as the waterproof camera disclosed in U.S. Pat. No. 4,803,504 to Maeno et al. Camera housings have also been provided with attachments or additional structures for novelty reasons such as the pipe camera shown in U.S. Design Pat. No. 115,727 to Anderson and the stick figure camera shown in U.S. Design Pat. No. 270,839 to Greif. The U.S. Design Pat. No. 41,900 to Ford illustrates still another novelty idea wherein the camera is mounted to a handgun configuration.

U.S. Pat. No. 4,989,024 to Myers is illustrative of the prior art wherein the camera is made an integral part of a simulated shotgun or pistol structure for photographing wildlife and the like. The U.S. Design Pat. No. 289,409 to Colani is a still further example of reshaping or recontouring the camera housing itself with additional appendatures utilized to form a fantasy item such as a spaceship.

None of the prior art devices, however, provide a carrying case for a complete camera and housing which is in the configuration of a specialized toy, the carrying case cooperating structurally and functionally with the features of the conventional camera. In this manner, the functions of both the camera and the handheld toy or amusement device are combined and cooperate to produce additional utility for air travel passengers and tourists.

SUMMARY OF THE INVENTION

According to the present invention, a handheld snapshot camera is combined with a casing or carrying case therefor which also functions as a toy airplane or amusement device. The toy airplane is in the configuration of the forward portion of an aircraft fuselage with cockpit, motor mounts and a foreshortened wingspan. The snapshot camera may be of more or less conventional design and fits snugly within the aircraft fuselage. The camera cooperates with the casing structure and contour such that the film spool-winding operator is exposed in an unobtrusive manner adjacent one of the motor mount positions on one side of the cockpit area. A shutter trip button carried by the camera forms a portion of the foreshortened wing surfaces on the opposite side of the cockpit so as to be readily available when the casing is held in the picture taking position. A conventional flash attachment may be removably mounted to a hot shoe or hanger on the underside of one of the foreshortened wing members. The aircraft fuselage has a nose cone section with a pivoted closure member which functions as a protective lens cover and which may be opened so as to expose the lens of the camera for picture taking. The nose cone section also includes a conical glare shield surface which cooperates with the camera lens during photographing. The camera is accurately positioned within the aircraft fuselage so as to cooperate with a view finder frame pivoted to the casing. The view finder frame also constitutes a portion of the cockpit formation and is pivoted into an upright position when functioning as a view finder. Thus the present invention contemplates a structural combination and interaction between a hand held snapshot camera and a toy airplane carrying case. The aircraft contour features of the toy device are uniquely used with the camera structure to obtain a result not accomplished by either device alone and which is of particularly utility to tourists and air travelers.

BRIEF DESCRIPTION OP THE DRAWINGS

FIG. 1 is a perspective view of the camera and carrying case combination;

FIG. 2 is a front elevational view of the combination;

FIG. 3 is a right side elevational view;

DESCRIPTION OF THE PREFERRED EMBODIMENT

Figure 4:
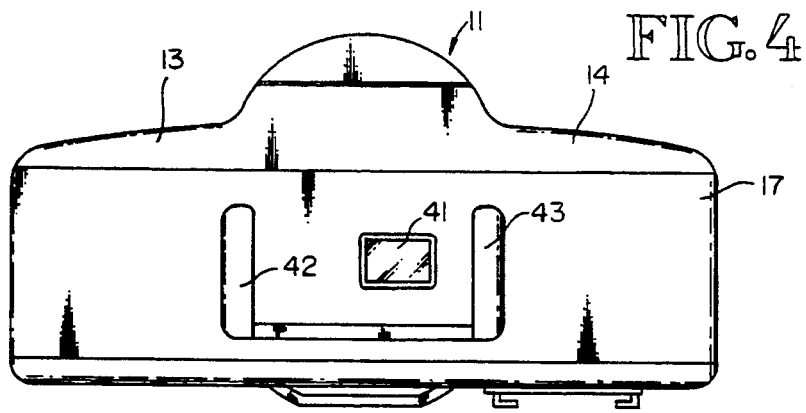
FIG. 4 is a rear elevational view.
Figure 5:
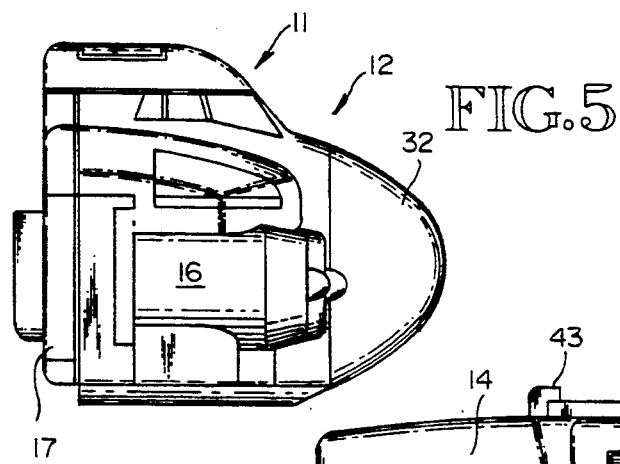
FIG. 5 is a left side elevational view.
Figure 6:
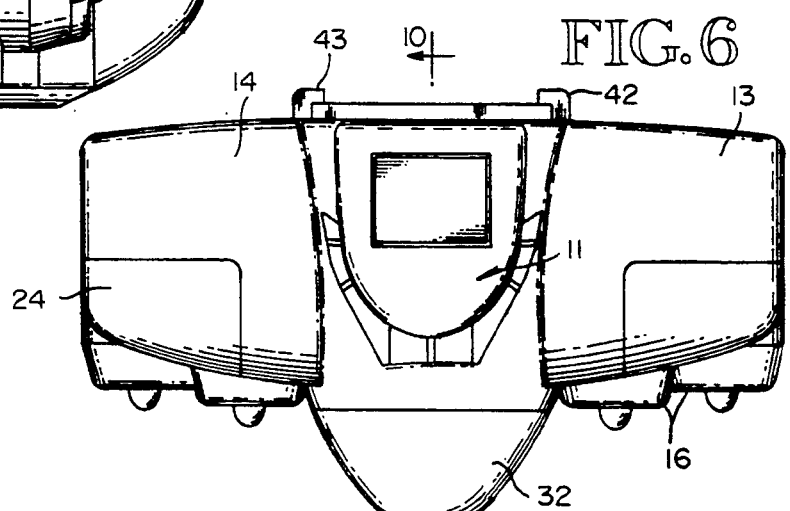
FIG. 6 is a top plan view.
Figure 7:
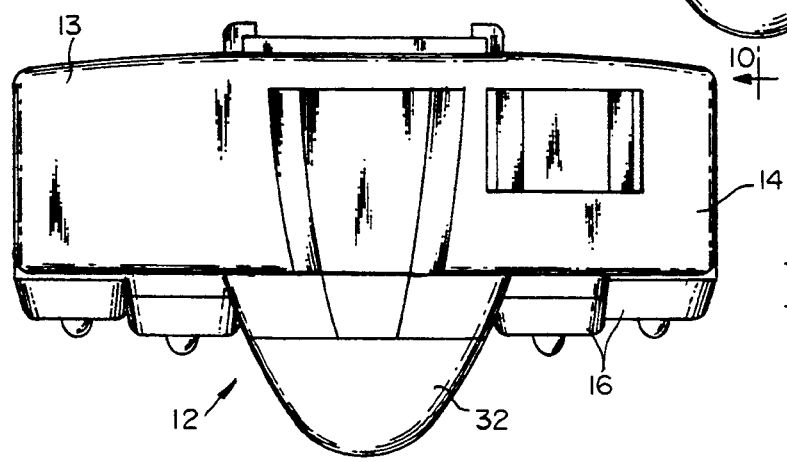
FIG. 7 is a bottom plan view of the combination.
Figure 8:
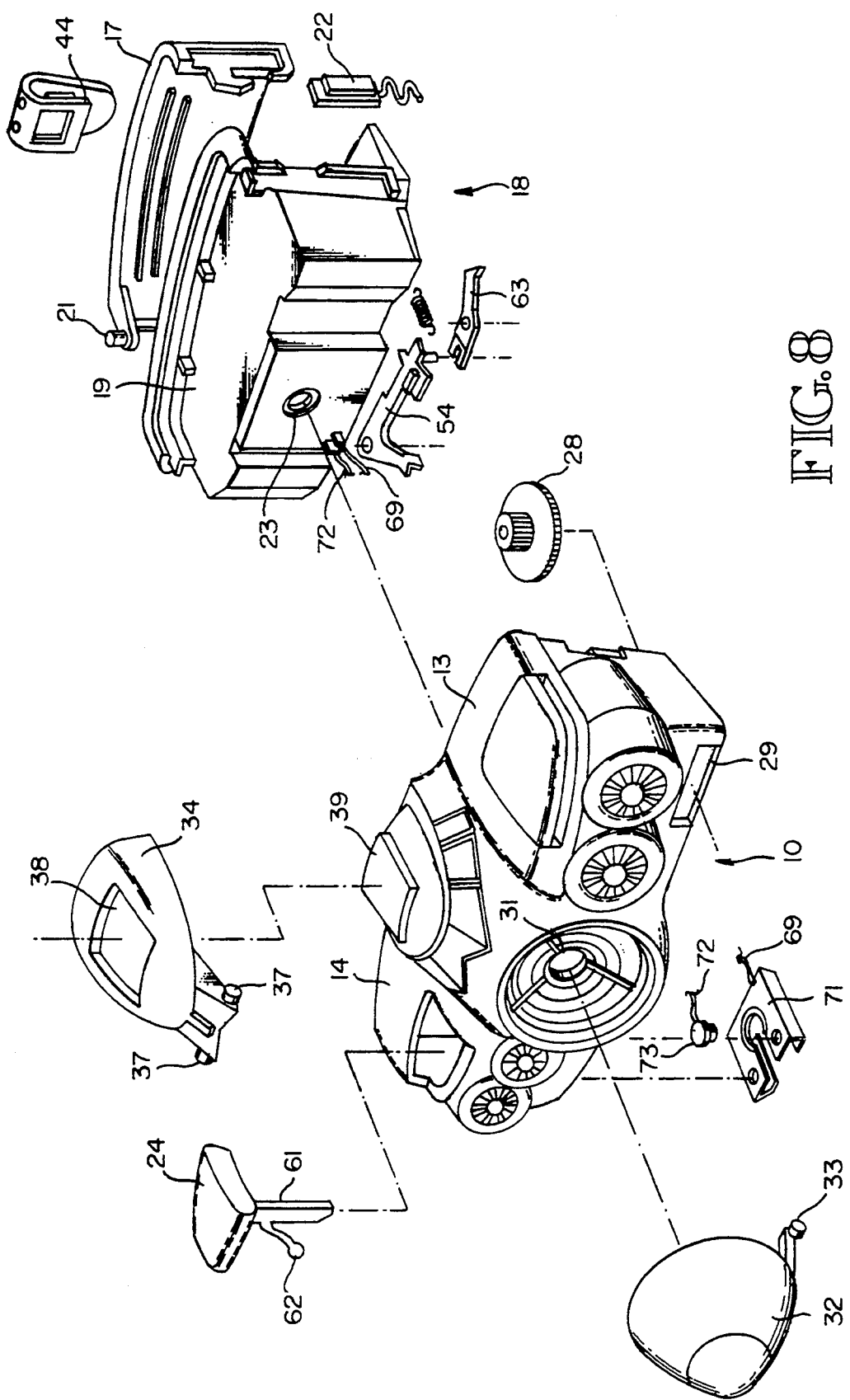
FIG. 8 is an exploded view of the camera combination illustrating certain assembly details of the device.

The surface structural features of the camera carrying case combination are shown most clearly in FIGS. 1-7 of the drawings. The carrying case comprises a hollow body indicated generally at 10 in FIG. 1 which is formed of plastic or the like and molded into the shape of the forward section of an aircraft fuselage. The fuselage includes the cockpit section 11, a nose cone section 12 which protrudes forwardly from the cockpit section and cooperates with the camera housed within the casing 10 in a manner to be described. The foreshortened wing structures 13 and 14 extend laterally from the cockpit section 11 and are both provided with simulated engine mounts 16 located therebeneath. The backside of the fuselage section is formed by the rear wall 17 of the snapshot camera unit indicated generally at 18 in the exploded view of FIG. 8. As may be appreciated most clearly form FIGS. 8 and 10, the camera unit 18 may be more or less conventional in its structure in that it includes its own housing or casing 19 which, along with the pivotally mounted back 17, provides a housing for the film spool holding and winding mechanisms and a shutter tripped flash function presently to be described. The rear wall 17 of the camera housing may be pivoted to the camera housing 19 by any conventional means such as the snap fit hinge post 21 shown in FIG. 8. The back member 17 may be latched to the housing 19 in any conventional manner such as the spring biased slide lock member 22 which cooperates with the housing 19 and back 17 to hold the back securely in the closed position in a well known manner. This structure will not be described in detail since it is well known in the camera arts. The camera unit 18 will also include a conventional lens mounting 23 and a shutter trip button 24 presently to be described in detail.

Figure 10:
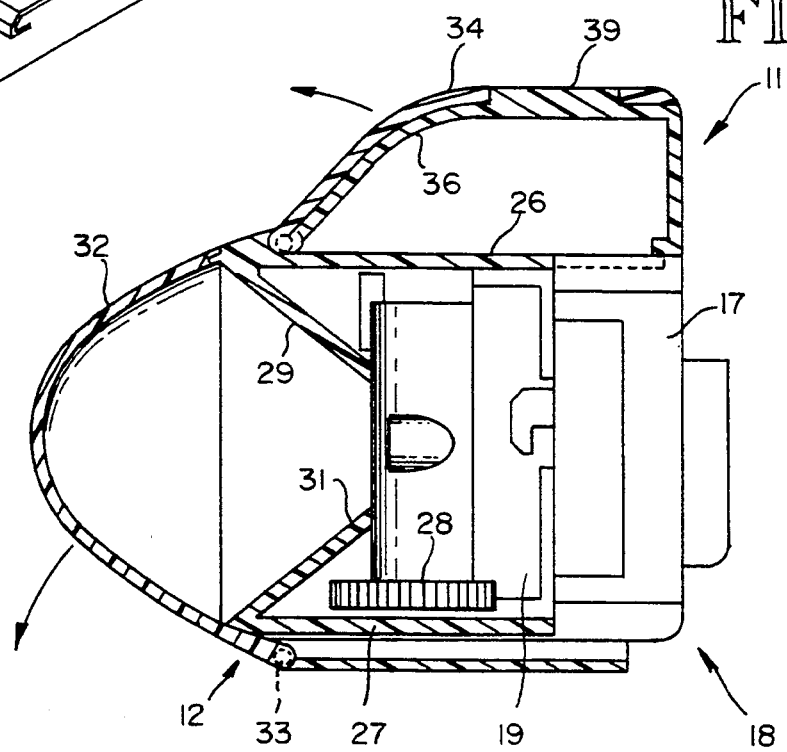
FIG. 10 is a crossectional view taken along lines 10-10 of FIG. 6.

FIG. 10 illustrates the positioning of the camera unit 18 within the hollow fuselage body directly beneath the cockpit area 11. The camera housing is configured to fit snugly between upper and lower interior walls 26 and 27 of the carrying case. The curved end portions and back surface of the member 17 serve to entirely close the carrying case 10 and the camera housing is held snugly between the wall members 26 and 27. The film spool winding knob 28 is located within the carrying case so as to have a portion of its grooved surface projecting outwardly through a slot 29 beneath one of the motor mounts on one side of the cockpit section. When the camera housing is in place within the carrying case the exposed spool winding knob or wheel 28 may thus be hand operated by the person holding the camera.

The nose cone section 12 of the carrying case fuselage is circular in cross section with an inwardly directed conical wall surface 29 which includes an opening 31 for cooperation with the lens mounting 23 in camera Housing 19. The opening 31 is in regirtry with the lens mounting 23 of the camera housing when the unit is assembled as illustrated in FIG. 10. The conical section 29 may be darkened or otherwise prepared as a glare or sun shield to enhance the function of the camera lens in a well known manner. In addition to the inwardly directed conical surface 29 the nose cone includes a pivotally mounted closure member 32 connected to the nose cone by means such as the pivot post 33 in a well known manner. The closure member 32 may be held in the closed position as shown in FIGS. 1-7 and 10 by means of a snap fit in a well known manner. In the closed position, the member 32 serves as a lens cap and, when moved to the open position, allows the camera to perform its function. The cockpit section of the carrying case provides a viewfinder in the nature of the cockpit roof section 34 which conforms to t hinged at its forward end by means of the hinge pins 37 to the wall of the nose cone section. As shown most clearly in FIGS. 8 and 10, the viewfinder frame 34 has an opening 38 which forms a snap fit on the raised section 39 of the cockpit wall to secure it in the closed position. The camera unit is so mounted within the carrying case that the opening 38 in the frame 34 outlines the subject to be photographed in a manner well known in the art.

The back wall 17 of the camera will also be provided with a film frame number viewing window 41 which is conventional with snapshot cameras. In addition, the wall 17 may be provided with the slides or rails 42 and 43 for receiving a belt clip or the like 44 as a means for carrying the camera.

Figure 9:
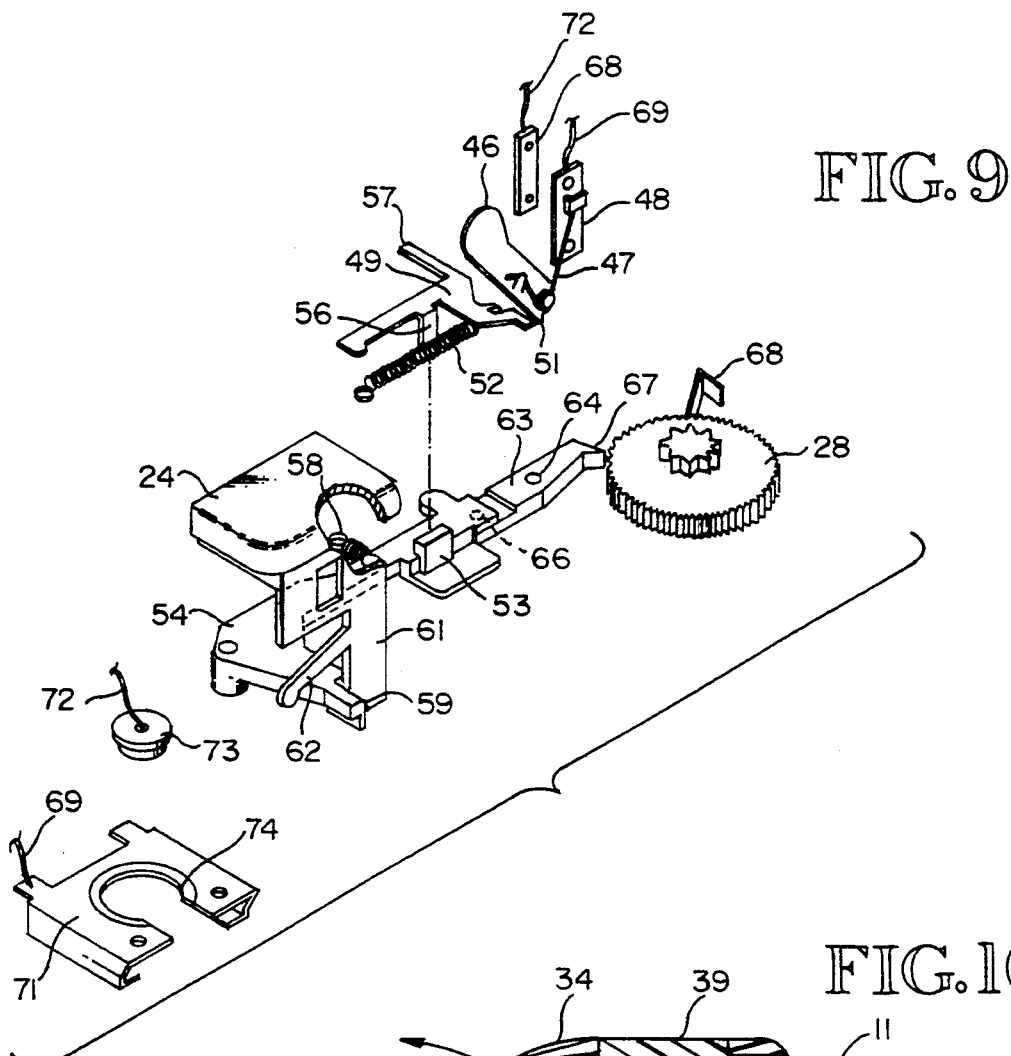
FIG. 9 is an exploded schematic view showing the shutter trigger and flash attachment operation.

Turning now to the shutter trip mechanism and flash function of the camera, reference is made to the exploded schematic view of FIG. 9. It will be understood that, except for the special adaptation to the present invention, the mechanical details and operation of the shutter and flash per se are not a part of the present invention. These details are being explained for the purpose of understanding the cooperation between the specialized carrying case of the invention and the operation of the camera. The pivotally mounted shutter element 46 is shown in the shutter-closed position and is held there by the bias of wire spring member 47. The shutter is a metallic member as is the spring 47 which is anchored on a contact plate 48 comprising one side of the circuit for the battery operated flash which will presently be described. The shutter trip bar 49 is mounted as a sliding member which contacts the detent 51 to operate the shutter and is biased to the left hand direction, as seen in FIG. 9, by the tension spring 52. In the shutter cocked position, the slide bar 49 is prevented from moving in the left hand direction by means of the block 53 o the crank arm 54 which contacts the arm 56 on the slide bar as illustrated. In the position shown in FIG. 9, the shutter has been operated to photograph and is closed ready to be recocked.

The slide bar 49 is provided with a dog 57 which engages a notch or hole in the edge of the film ad is moved thereby as the successive frames on the film are indexed in a known manner. The crank arm 54 is spring biased by the tension spring 58 and is held in position by virtue of its contact with the cam surface 59 on the vertical slide post 61 of the shutter trip button 24. The slide 61 is made from plastic ad includes an integral flexible spring finger 62 which holds it in the upward or normal position ready for operation. Also contained in the operating linkage is a lever 63 which is pivoted about the point 64 and pivotally connected at 66 to the crank arm 54. The lever 63 has one end point 67 which is contacted by the notches on film spool winding knob 28. The member 28 is a ratchet wheel having a dog or the like 68 to prevent reverse winding of the film strip in a well known manner.

Following the schematic of FIG. 9, operation of the shutter and flash will be described. The film is advanced by turning the wheel 28 which simultaneously pivots the lever 63, counterclockwise in FIG. 9, so as to swing the crank arm 54 against the bias of spring 58 to displace the block 53 allowing the arm 56 to move. Also simultaneously, the movement of the film, by virtue of engagement with dog 57, slides the member 49 to the right as shown in FIG. 9 against the bias of tension spring 52. The end of the arm 49 is moved to the far side of the detent 51 of the shutter. As the contact 67 moves into a final groove in the surface of wheel 28, the block 53 is allowed to move back to its blocking position so that slide 49 cannot return to the right hand position. The shutter is now cocked ready for photographing and flash operation.

To operate the shutter, the button 24 in the wing surface of the carrying case is depressed so as to swing the crank arm 54 clockwise about its pivot by means of the cam surface 59. This action moves the blocking member 53 out of the path of the arm 56 and allows the spring 52 to move the slide bar 49 to the left in FIG. 9. The bar contacts the detent 51 and the shutter 46 is instantaneously moved to the open position against the bias of spring 47. The instant the shutter opens, it contacts the second contact plate 68 completing a battery circuit through the flash attachment. It will b understood that one lead wire 69 is connected between the contact 48 and the flash hot shoe 71. A second lead 72 connected to the contact plate 68 is connected to a contact button 73 mounted in the hot shoe 71. In order to electrically insulate the button 73 from the shoe 71, a plastic or other insole or ring or grommet 74 is used to mount the button. With these parts assembled, a conventional battery operated flash unit 76, as shown in FIG. 2, may be attached to the bottom surface of one of the wing sections.

The present invention has been described and illustrated with respect to a specific embodiment thereof. It will be apparent to those skilled in the art, however, that modification to the structure as described may be made without departing from the spirit of the invention or from the scope of the appended claims.

What I claim is:

1. A camera and simulated aircraft carrying case combination comprising;
    a hollow aircraft fuselage body portion including front and rear sides and wing sections extending laterally therefrom,
    a cockpit section on said fuselage body having a nose cone area on the front side thereof with camera lens opening means therein,
    a camera unit having a housing and including lens means, film winding means and shutter trip means,
    means mounting said camera unit in said fuselage body with the camera housing defining the rear side thereof and said lens means in registry with the lens opening means, and
    opening means on the surface of said fuselage body providing access to said film winding means and said shutter trip means.

2. The combination of claim 1 wherein said nose cone area includes a sun shield surface inclined inwardly toward said lens opening means.

3. The combination of claim 2 including a closure cap mounted to said nose cone area, and
    means mounting said closure cap for pivotal movement between a closed position against the nose cone area providing a contiguous surface therewith covering said camera lens means and an open position removed from said camera lens means to allow photographing.

4. The combination of claim 3 wherein the opening means in said wing sections comprise a first opening in one said wing section providing access to said shutter trip means,
    said shutter trip means including a contact surface contiguous with the surface of said one wing section,
    second opening means in the surface of the other of said wing sections providing access to said film winding means.

5. The combination of claim 4 wherein said cockpit section includes a roof area located directly above said camera unit,
    a frame on said cockpit section having a view finder opening therein for locating a subject to be photographed, and
    means mounting said frame on said cockpit section relative to said camera lens such that said camera will photograph the view located in said view finder opening in a first pivoted position and to lay against the roof area of said cockpit section and form a surface contiguous therewith in a second pivoted position.

6. The combination of claim 5 including a self contained battery powered flash unit,
    attachment means fixed to the bottom surface of one of said wing sections for removably attaching said flash unit thereto,
    said attachment means including electrical contact means for completing the electrical circuit of said flash unit,
    said camera including circuit means connected to said electrical contact means for completing the electrical circuit
    of said flash unit upon operation of said shutter trip means.

7. A camera and simulated aircraft carrying case combination comprising;
    a hollow aircraft fuselage body portion including front and rear sides and foreshortened wing sections extending laterally therefrom,
    a cockpit section on said fuselage body having a nose cone area on the front side of said body and including lens opening means therein,
    said fuselage body including an open access area in the rear side thereof opposite said nose cone area,
    a camera unit including a camera housing having lens means therein,
    means for mounting said camera housing within said fuselage body through said access opening with said lens means in registry with said lens opening means, said camera housing defining the rear side of the fuselage body,
    said camera housing including photographic film mounting means and film winding means therefor,
    shutter means in said housing and shutter trip means associated therewith cooperating with said film strip and said lens for producing photographs,
    said fuselage body including first opening means in the surface thereof for positioning said film winding means and second opening means in the surface thereof for positioning said shutter trip means,
    whereby said camera may be mounted within said aircraft fuselage as a carrying case with said lens positioned for photographing and said film winding means and said shutter trip means accessible on the fuselage surface for operation by the holder.

8. The combination of claim 7 wherein said nose cone area includes a sun shield surface inclined inwardly toward said lens opening means.

9. The combination of claim 8 including a closure cap mounted to said nose cone area, and
    means mounting said closure cap for pivotal movement between a closed position against the nose cone area providing a contiguous surface therewith covering said camera lens means and an open position removed from said camera lens means to allow photographing.

10. The combination of claim 9 wherein said first and second opening means are located in said wing sections respectively,
    said shutter trip means including a contact surface contiguous with the surface of the associated wing section.

11. The combination of claim 10 wherein said cockpit section includes a roof area located directly above said camera unit,
    a frame on said cockpit section having a view finder opening therein for locating a subject to be photographed, and
    means mounting said frame on said cockpit section relative to said camera lens such that said camera will photograph the view located in said view finder opening in a first pivoted position and to lay against the roof area of said cockpit section and form a surface contiguous therewith in a second pivotal position.

12. The combination of claim 11 including a self contained battery powered flash unit, attachment means fixed to the bottom surface of one of said wing sections for removably attaching said flash unit thereto, said attachment means including electrical contact means for completing the electrical circuit of said flash unit, said camera including circuit means connected to said electrical contact means for completing the electrical circuit of said flash unit upon operation of said shutter trip means.

* * * * *